I. TORNER AND E. TETZEL, Jr.
PLASTIC MOLD.
APPLICATION FILED JAN. 2, 1918.

1,313,355.

Patented Aug. 19, 1919.
2 SHEETS—SHEET 1.

Isaac Torner
Edmund Tetzel, Jr.
Inventors

By Geo. P. Kimmel
Attorney

I. TORNER AND E. TETZEL, Jr.
PLASTIC MOLD.
APPLICATION FILED JAN. 2, 1918.

1,313,355.

Patented Aug. 19, 1919.
2 SHEETS—SHEET 2.

Isaac Torner
Edmund Tetzel, Jr
Inventors

By Geo. P. Kimmel

Attorney

UNITED STATES PATENT OFFICE.

ISAAC TORNER AND EDMUND TETZEL, JR., OF TERRE HAUTE, INDIANA.

PLASTIC-MOLD.

1,313,355.  Specification of Letters Patent.  Patented Aug. 19, 1919.

Application filed January 2, 1918. Serial No. 209,880.

*To all whom it may concern:*

Be it known that we, ISAAC TORNER and EDMUND TETZEL, Jr., citizens of the United States, residing at Terra Haute, in the county of Vigo and State of Indiana, have invented certain new and useful Improvements in Plastic-Molds, of which the following is a specification.

This invention relates to plastic molding apparatus and it is the principal object of the invention to provide a collapsible form for use in the molding of culverts and the like whereby the plastic material from which the same are formed will be maintained in proper shape until the same has become sufficiently hard or set, whereupon the form can be then collapsed and removed therefrom without disturbing or injuring the product in any way.

Another and equally important object of the invention is to provide novel form supporting means, which means are arranged to permit the adjusting of the same in order that culverts or similar devices differing in size can be made thereby without the necessity of employing additional forms.

Yet another important characteristic of the invention resides in the manner in which the form supporting means are arranged, whereby the same can be moved collectively for adjusting the forms.

Other objects will be in part obvious and in part pointed out hereinafter.

The invention consists, furthermore, in the novel arrangements and combinations of the parts of the form, as well as in the details of the construction of the same, all of which will be more fully described in the following specification, and then finally embodied in the clauses of the claim which are appended to the specification and which form an essential part of the same.

The invention is clearly illustrated in the accompanying drawings, in which:—

Fig. 3 is a fragmental section through one of the heads, and,

Similar reference characters refer to similar parts throughout the several views of the drawings.

Figure 1:
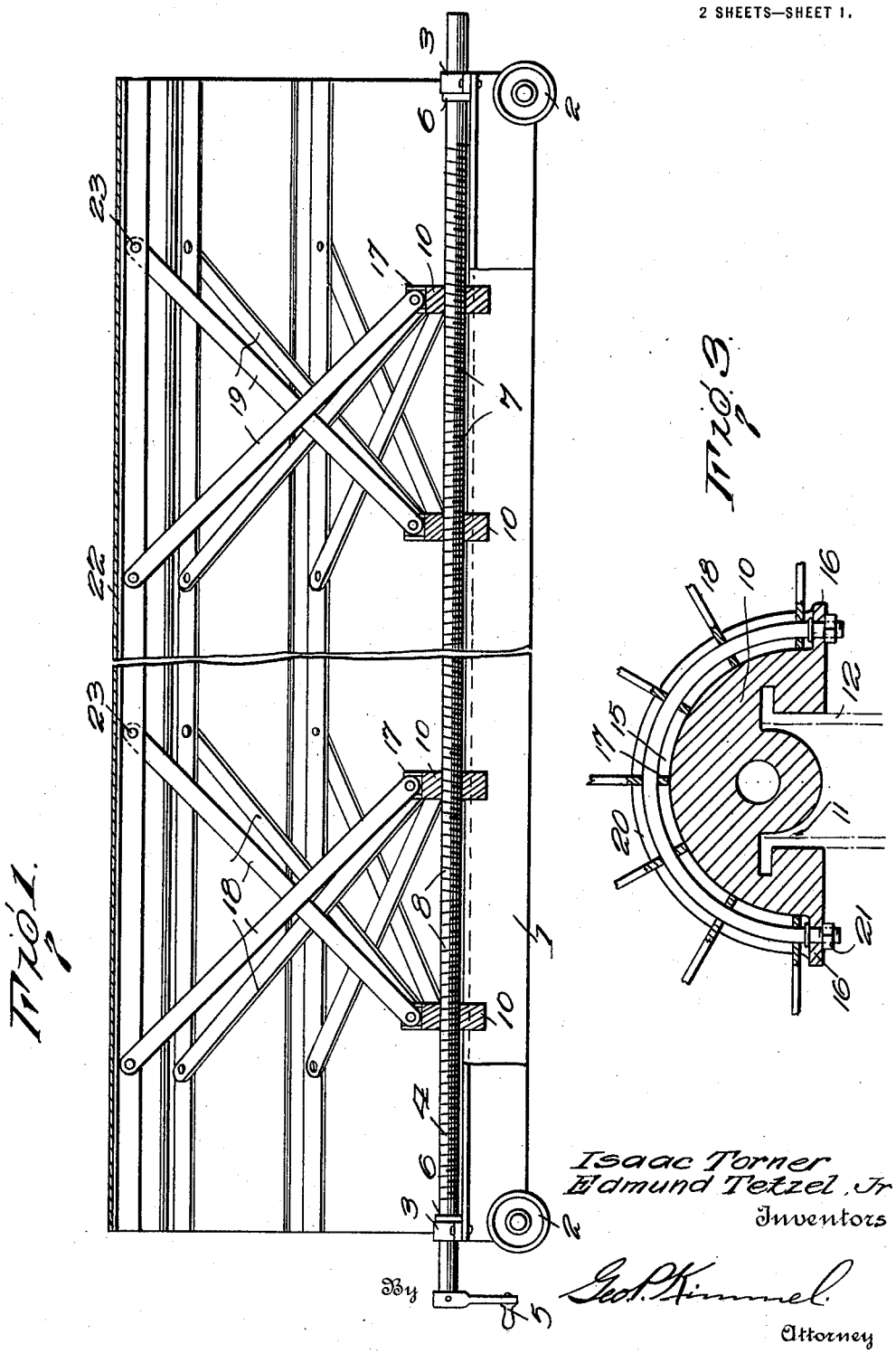
Figure 1 is a vertical longitudinal section through the improved form.
Figure 2:
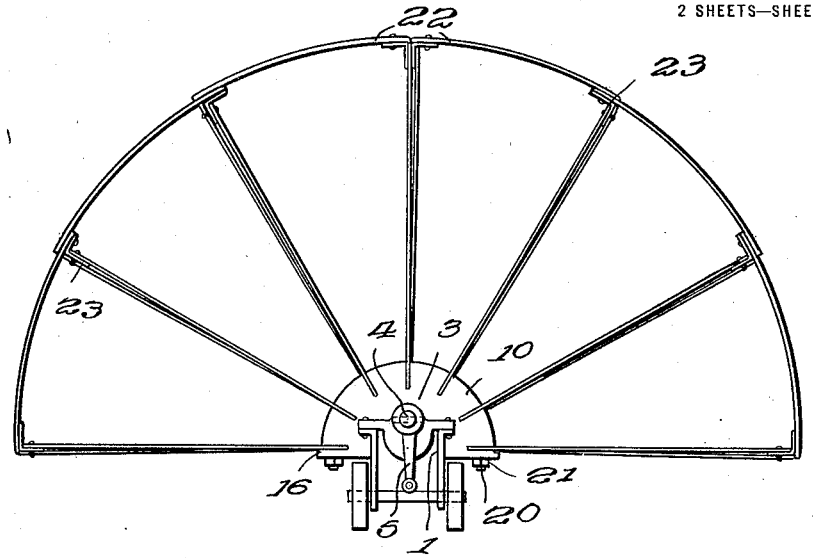
Fig. 2 is a vertical transverse section therethrough.
Figure 4:
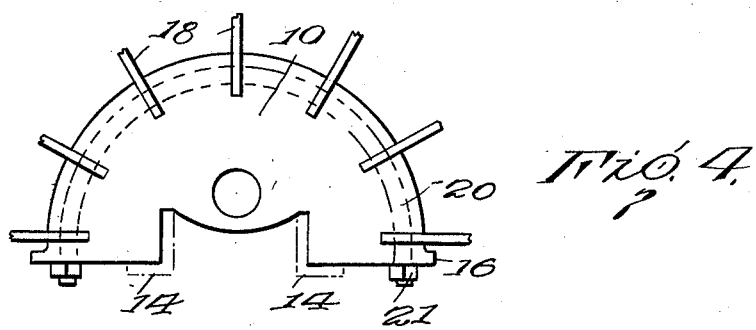
Fig. 4 is an elevation of a slightly modified form of head.

Having more particular reference to the drawings, 1 represents the base of the form, the same being provided with oppositely disposed wheels 2, whereby moving of the form will be readily permitted. Bearings 3 are arranged upon the upper surface of the base 1 at points adjacent the opposite ends of the same and receive the opposite portions of a longitudinally disposed shaft 4 therethrough, one end of the said shaft having a crank handle 5 or other suitable operating means engaged therewith. To prevent lateral movement of the shaft, collars 6 may be and preferably are arranged thereon and engage with the adjacent faces of the bearings 3. In this connection, it is to be noted that portions of the shaft 4 are provided with right and left handed threads indicated by the numerals 7 and 8, over which a plurality of pairs of head pieces 10 are engaged, the said head pieces being provided with internally screw threaded bores corresponding to the pitch of the threads 7 and 8 with which the same are engaged. In order that the heads 10 will be securely and slidably engaged with the base 1, we provide an undercut way 11 in each of the same, these ways receiving the laterally disposed portions of guide rails 12 therein. It may be here noted, that the way 11 may be varied in design, such as conditions or preference may dictate, as shown in Fig. 4, wherein the head pieces are provided with plane ways or recesses 13 for receiving the vertical portions of guide rails 14, which guide rails are formed of angle metal. The head pieces 10 are semi-circular in shape and have longitudinally disposed grooves 15 formed in the peripheral surfaces thereof, while bifurcated lugs 16 are formed upon the opposite extremities thereof for a purpose which will be subsequently described. Communicating with the grooves 15 are a plurality of radially disposed slots or pockets 17, which also will be more fully hereinafter described.

Form supporting arms 18 and 19 are provided and as will be noted, have their lower ends pivotally engaged with their respective pairs of head pieces 10 by means of a semicircular tie rod 20 which rod is passed through suitable openings formed in the said lower ends and have the heads of the same engaged in one of the bifurcated lugs 16 while the remaining end thereof is arranged between the remaining bifurcated lug 16 on each of the head pieces 10 and secured thereto by locking nuts 21 which are turned into engagement with suitably screw threaded extremities thereon. Thus, it will be understood that the semi-circular rod 20 will seat in the longitudinal grooves 15 formed in the various head pieces 10 and as a consequence, the lower ends of the form supporting arms 18 and 19 will be effectually secured in position with relation to the base 1.

A form composed of a plurality of curved sectional plates generally indicated by the numeral 22 is provided and as will be noted, each of these sections have the upper ends of the various pairs of supporting arms 18 and 19 pivotally secured thereto as at 23. Due to the fact that the form is composed of a plurality of sections, it will be readily understood that relative movement of the same will be permitted; hence, it may be collapsed when desired.

In operation, the sectional form 22 is normally arranged in its collapsed folded position, whereat the various pairs of arms 18 and 19 are also arranged in their lowermost position and the head pieces 10 to which they are connected are positioned accordingly. To set the form up previous to the arrangement of the plastic material thereover, it is only necessary to rotate the shaft 4 through the medium of the crank handle 5, whereupon the sectional form 22 will be raised to the desired height and, of course, adjusted to the proper width. With the form so positioned, the plastic material may be now arranged thereover and permitted to become sufficiently hard or set. To remove the form from engagement with the material, the shaft 4 is now rotated in a reverse direction causing the arms 18 and 19 to be folded and consequently, the sectional form 22 to collapse. When in its collapsed or folded position the form may be readily withdrawn from engagement with the product, due to the fact that the base 1 is mounted on the wheels. Thus, the completed article is finished without the usual laborious task of disassembling the form piece meal and perchance, injuring the same during such operation.

It is to be also understood, that our improved form may be used for molding plastic material varying in size, due to the adjustable arrangement of the section form. Further, by varying the particular design or shape of the sectional form, devices differing in shape may be also molded thereby. By mounting the arms 18 and 19 so as to cause the crossing of the intermediate portions thereof when they are in raised position, it will be readily understood that the form construction is materially braced by the pressing action thus given. This, renders the form especially desirable for use in connection with the molding of heavy concrete work; avoiding the collapsing of the structure or the undue giving or ply thereof.

Manifestly, the construction shown is capable of considerable modification and such modification as is within the scope of our claim, we consider within the spirit of our invention.

We claim:—

A plastic mold including a wheeled base, guide means disposed longitudinally thereof, head pieces secured to and slidable on the base, a shaft mounted in bearings longitudinally of the base, said head pieces having ways formed in their peripheral surfaces, lateral lugs carried by said head pieces adjacent the extremities of the ways, oppositely disposed crossed arms having certain of their ends engaged in said peripheral ways, a segmental bolt passing through the ways secured at its opposite ends to said lugs for pivoting the adjacent ends of the crossed arms to the head pieces, and an adjustable form supported on the remaining ends of said arms.

In testimony whereof, we affix our signatures hereto.

ISAAC TORNER.
EDMUND TETZEL, Jr.

Copies of this patent may be obtained for five cents each, by addressing the "Commissioner of Patents, Washington, D. C."